(12) United States Patent
Walker

(10) Patent No.: US 6,230,191 B1
(45) Date of Patent: May 8, 2001

(54) METHOD AND APPARATUS FOR REGULATING THE AMOUNT OF BUFFER MEMORY REQUESTED BY A PORT IN A MULTI-PORT SWITCHING DEVICE WITH SHARED BUFFER MEMORY

(75) Inventor: Jeffrey J. Walker, Spokane, WA (US)

(73) Assignee: Alcatel Internetworking (PE), Inc., Spokane, WA (US)

( * ) Notice: Subject to any disclaimer, the term of this patent is extended or adjusted under 35 U.S.C. 154(b) by 0 days.

(21) Appl. No.: 09/172,100

(22) Filed: Oct. 5, 1998

(51) Int. Cl.$^7$ ........................................... G06F 13/00

(52) U.S. Cl. .................... 709/213; 709/232; 709/238

(58) Field of Search ................................. 709/213, 215, 709/230, 232, 238, 104; 710/37, 52, 56; 711/147, 149, 151, 153; 370/368, 381, 383

(56) References Cited

U.S. PATENT DOCUMENTS

| | | | |
|---|---|---|---|
| 5,438,567 | * 8/1995 | Ikeda | 370/417 |
| 5,812,525 | * 9/1998 | Teraslinna | 370/229 |
| 5,838,681 | * 11/1998 | Bonomi et al. | 370/395 |
| 5,838,922 | * 11/1998 | Galand et al. | 709/232 |
| 6,009,078 | * 12/1999 | Sato | 370/232 |
| 6,021,132 | * 2/2000 | Muller et al. | 370/412 |

OTHER PUBLICATIONS

"Switching Basics," *High–Speed Networking with LAN Switches*, by Gilbert Held, chapter 2, pp. 33–61 (1997).

"Frame Switching, Routing, and Protocols," *Fast Ethernet*, by Liam B. Quinn and Richard G. Russell, chapter 7, pp. 109–147 (1997).

"Switched Ethernet and Fast Ethernet Standards," *Switched and Fast Ethernet: How It Works and How to Use It*, by Robert Breyer and Sean Riley, chapter 3, pp. 41–78 (1995).

* cited by examiner

Primary Examiner—Viet D. Vu
(74) Attorney, Agent, or Firm—Scot A. Reader; Alcatel Internetworking, Inc.

(57) ABSTRACT

In a switching device such as a network switch having multiple ports and shared buffer memory, method and apparatus for regulating the amount of buffer memory requested by a port. The method includes determining a limit number of buffers that a port may use from the number of available buffers in memory and the number of buffers in memory currently in use by the port. The limit number and number of buffers currently is use are then compared, and the comparison is used to determine whether a buffer request by the port will be generated. In an illustrative embodiment, determining the limit number includes adding the number of available buffers in memory with the number of buffers in memory currently in use by the port to obtain a sum, and multiplying the sum by a port allocation factor. The port allocation factor may be set independently for each port. Apparatus within the switching device practices the method in accordance with the invention.

15 Claims, 2 Drawing Sheets

METHOD AND APPARATUS FOR REGULATING THE AMOUNT OF BUFFER MEMORY REQUESTED BY A PORT IN A MULTI-PORT SWITCHING DEVICE WITH SHARED BUFFER MEMORY

FIELD OF THE INVENTION

This invention relates generally to switching devices for networks such as local area networks (LANs) and, more particularly to a method regulating the amount of buffer memory each port will consume in a shared memory switching device.

BACKGROUND OF THE INVENTION

A local area network (LAN) is a system for directly connecting multiple computers so that they can directly exchange information with each other. LANs are considered local because they are designed to connect computers over a small area, such as an office, a building, or a small campus. LANs are considered systems because they are made up of several components, such as cables, repeaters, switches, routers, network interfaces, nodes (computers), and communication protocols. Ethernet is one such protocol. Information is communicated through a LAN in frames transported within data packets. ("Frame" and "data packet," while technically different, are often used interchangeably to describe data carrying the information.)

A LAN switch (or, more generally, a packet switch) is generally defined as a multi-port device that transfers data between its different ports based on the destination addresses and/or other information found in the individual packets it receives. Switches can be used to segment LANs, connect different LANs, or extend the collision diameter of LANs. Switches are of particular importance to Ethernet-based LANs because of their ability to increase network diameter. Additional background information on packet switches can be found in a number of references such as *Fast Ethernet* (1997) by L. Quinn et al., *Computer Networks* (3rd Ed. 1996) by A. Tannenbaum, and *High-Speed Networking with LAN Switches* (1997) by G. Held, all of which are incorporated herein by reference.

There are three common switching architectures used in packet switches for forwarding frames from one port to another: crosspoint (also known as crossbar) matrix, shared bus, and shared memory. A crossbar matrix essentially creates a very transient "circuit" between ports for the duration of a frame (or subset of a frame) exchange. There is an electronic switch located at each crossbar in the matrix between every matrix input and output. A switch controller establishes a direct connection within the switch between two ports, based on the destination address and/or other information within a data packet acquired by the packet's entry port. The packet is then forwarded directly from the entry port (also referred to as the sending port) to an exit port (also referred to as a destination port).

A shared-bus architecture uses a common bus as the exchange mechanism for data packets between ports. Each port (or small group of ports) has its own memory, both for input and output queues, depending on the design.

A shared memory architecture uses a single common buffer memory as the exchange mechanism for frames between ports. All ports access the shared memory via a shared memory bus. An arbitration mechanism, such as time division multiplexing, controls port access to the memory, assuring each entry port a chance to store data that it receives within memory where the exit port can then access it. The buffer memory temporarily stores data packets while routing decisions and re-transmission takes place. Typically, buffer memory is allocated to each port on an as-needed basis from a central pool of buffers, with each allocated buffer returning to the pool when it is no longer needed.

Normal network traffic flow into each port of a switch, however, is bursty in nature, requiring significant amounts of buffer memory for short periods of time but requiring little or no memory at other times. This characteristic makes it desirable to allow any switch port to acquire as much available shared memory as needed. But an unmanaged "take all you need," or "first come, first served" memory allocation scheme can lead to unregulated overflow of memory usage. This scheme can result in sporadic discards or chaotic generation of flow control messages on several branches of the network as incoming traffic has nowhere to be stored.

An objective of the invention, therefore, is to flow control or discard incoming traffic on only those ports that are consuming excessive amounts of buffer memory and leave unaffected the traffic flow between non-offending ports. More particularly, an objective of the invention is to provide a simple, cost-effective method for regulating the buffer memory requested by a port in a shared memory switching device.

SUMMARY OF THE INVENTION

A method of regulating buffer memory in accordance with the invention includes determining a limit number of buffers that a port may use from the number of available buffers in memory and the number of buffers in memory currently in use by the port. The limit number and number of buffers in memory currently in use by the port are then compared, and the comparison is used to determine whether a buffer request by the port will be granted.

In one aspect of the invention, determining the limit number may include combining the number of available buffers in memory, the number of buffers in memory currently in use by the port, and a port allocation factor to obtain the limit number of buffers. In another aspect of the invention, the combining step comprises adding the number of available buffers in memory with the number of buffers in memory currently in use by the port to obtain a sum and applying the port allocation factor to the sum such as by multiplying the two together.

Other aspects of the invention include the following. The comparison may be used to prevent the buffer request if the number of buffers currently in use by the port is greater than or equal to the limit number. The port allocation factor may be independently set for each port. The steps of the method may be repeated periodically. The steps of the method may be taken concurrently by multiple ports.

Apparatus within a switching device that practices the method in accordance with the invention is also disclosed. The apparatus may be located within each port to allow the ports to self-regulate their buffer requests.

The invention may be used to regulate the maximum amount of buffer memory that any port in a shared memory switching device may be allocated. An upper limit is derived with the method of the invention for buffering incoming traffic, beyond which the port initiates flow control or discards the incoming traffic. The allocation factor provides a means to give certain ports access to more memory than others, thereby giving these ports higher significance over other ports and reducing the likelihood that their incoming traffic will be interrupted because of a lack of buffer memory.

Other features and advantages of the invention will become apparent from the following description of an illustrative embodiment and the accompanying drawings.

DETAILED DESCRIPTION OF AN ILLUSTRATIVE EMBODIMENT

Structure and Its Function

Figure 1:
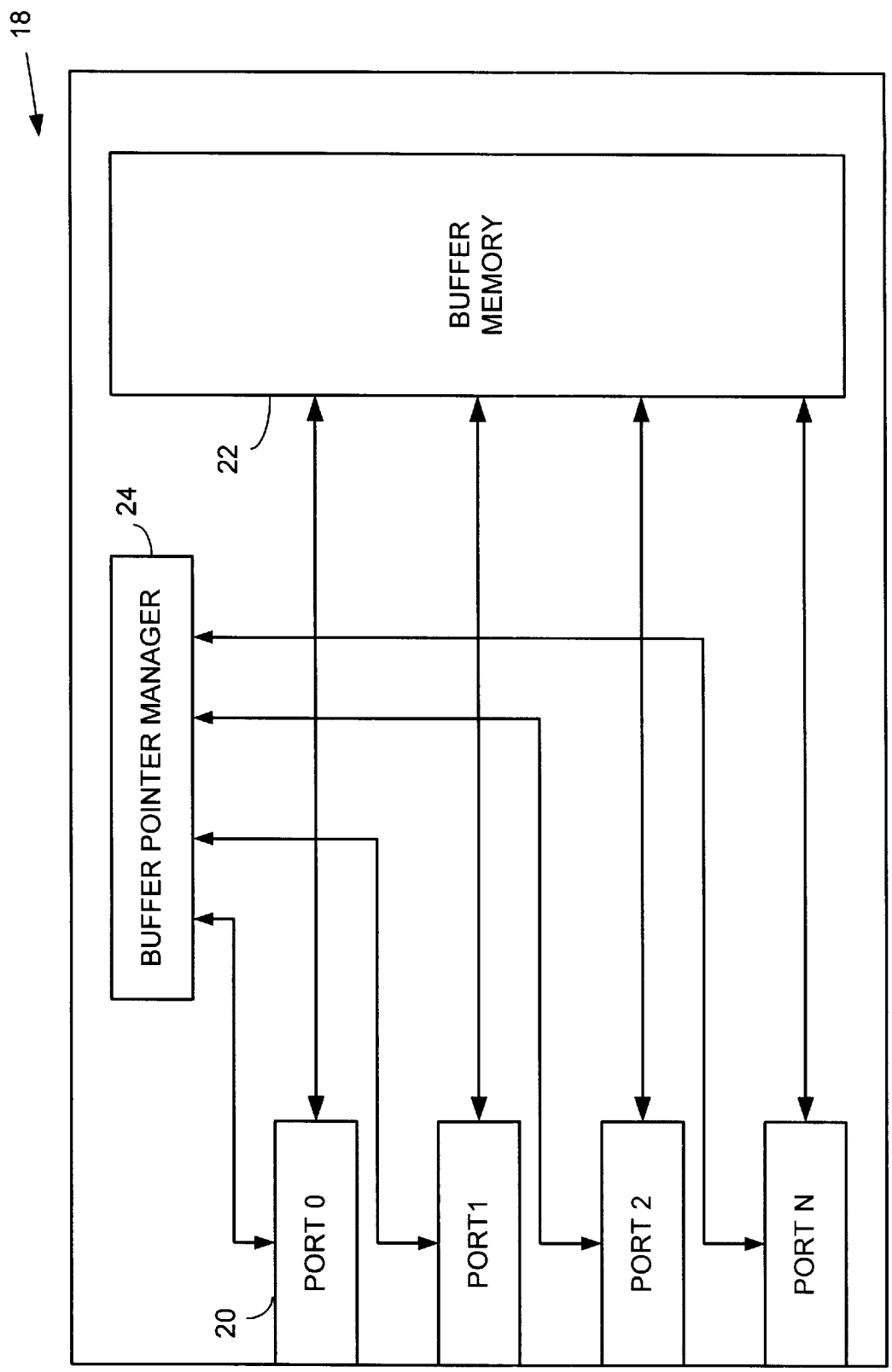
FIG. 1 is a block diagram of a switching device in accordance with the invention, showing the ports, buffer pointer manager, buffer memory and their interconnections.

FIG. 1 is a block diagram of a switching device 18 in accordance with the invention. The switching device includes a number of bidirectional ports 20 (numbered individually as ports 0 through N) through which data packets are passed. For purposes of this description, a port that is acquiring a data packet from an external entity such as a network node, for example, is referred to as an entry port, and a port that is sending a data packet from the switch to an external entity is referred to as an exit port. Also shown within the switch 18 is a shared buffer memory 22 in which data packets are stored by an entry port and retrieved by an exit port and a buffer pointer manager 24 for allocating buffer pointers to the various ports. Each port communicates with the buffer pointer manager to request and receive buffer pointers, as will be described in more detail. A buffer pointer is an address into memory 22 at which the port can store a data packet. When an entry port receives a data packet, it requests a buffer pointer from the buffer pointer manager. It then uses the pointer to store the data packet in memory 22. Once the exit port(s) retrieves the packet from the pointed-to memory, the exit port returns the buffer pointer to the buffer pointer manager.

For example, port 0, as an entry port, may receive a data packet that is destined for port 2. Port 0 requests a pointer from buffer pointer manager 24. The buffer pointer manager responds by providing a pointer. Port 0 then stores the received data packet at the location in memory indicated by the pointer. Port 2 is alerted that there is a data packet at the pointed-to location for it to retrieve. Port 2 retrieves the data packet, transmits it and then returns the pointer to the buffer pointer manager, signaling that the pointed-to memory is available for re-use.

The switch 18, of course, includes many other components found in such switches. These components are not shown and are not described because they are not germane to the invention.

Figure 2:
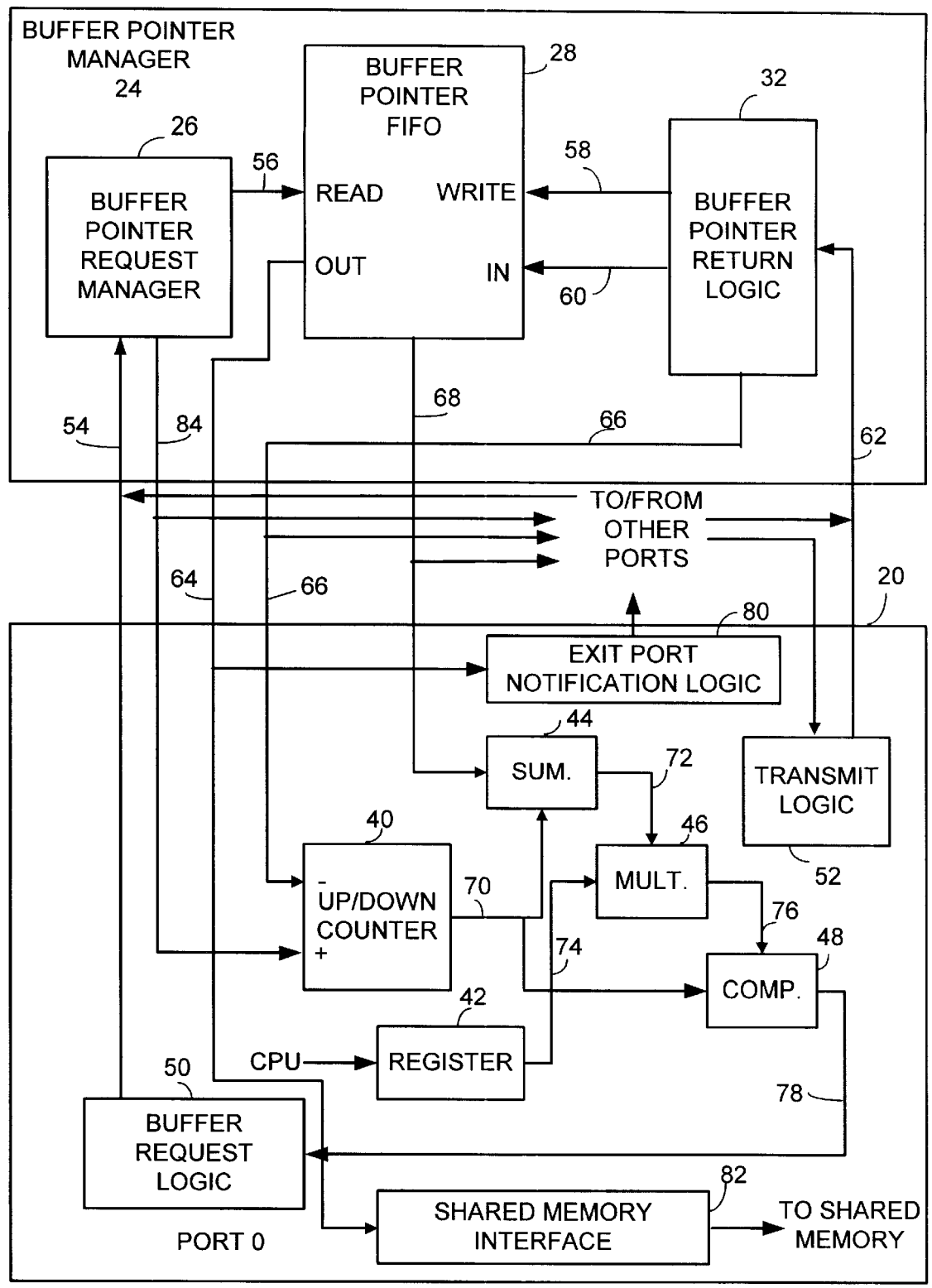
FIG. 2 is a more detailed block diagram of the buffer pointer manager and one of the ports and their interconnection.

FIG. 2 is a more detailed block diagram of the buffer pointer manager and one of the ports (port 0) and their interconnections. The structure shown in port 0 also exists in the other ports; those ports and structures have been omitted from the figure for clarity. The buffer pointer manager 24 includes a buffer pointer request manager 26, a buffer pointer FIFO (first in, first out storage) 28, and buffer pointer return logic 32. A port 20 (port 0 in this example) includes an up/down counter 40, a register 42, summing logic 44, a multiplier 46, a comparator 48, buffer request logic 50, and transmit logic 52.

The buffer pointer FIFO 28 holds all pointers not currently in use by the switch 18 and is controlled by the buffer pointer request manager 26 and the buffer pointer return logic 32. Buffer requests from port 0 are made as input traffic warrants and are input to buffer request manager 26 on a signal path such as multi-member bus 54. The bus 54 has N members, one member for each port in the switch. As it services each buffer request, the request manager 26 fulfills each request by directing buffer pointer FIFO 28 via control bus 56 to send a next pointer on bus 64 to the requesting port 0. Port 0 then passes this pointer to a shared memory interface 82. The memory interface uses the pointer to store a data packet at the memory location in memory 22 pointed to by the pointer. Port 0 also, passes this pointer, via exit port notification logic 80, to the exit port that will be transmitting the pointed-to packet. Once the exit port that is to transmit the data packet has retrieved it from memory 22, the exit port returns the pointer to buffer pointer FIFO 28 via transmit logic 52 (on the exit port), multi-member bus 62, pointer return logic 32, control bus 58, and pointer bus 60.

As each pointer is allocated, the buffer pointer request manager 26 generates an allocation signal on multi-member bus 84 that connects the request manager to the up/down counter 40 in each port 20. The allocation signal is encoded so that the signal sent to the port receiving the pointer increments the counter; all other signals do not affect the respective counters. For example, a logic one signal might be sent on the member of bus 84 that connects to buffer pointer request manager 26 to the increment (+) input of counter 40 on port 0 to increment the counter; all other counters would receive a logic zero that would not affect the counters. Other encoding schemes may be used.

As each pointer is returned from a port to the buffer pointer return logic 32, the return logic outputs a de-allocation signal and transmits it on multi-member bus 66 to the decrement (−) input of the counter 40 on each port. Because of its encoded nature, the de-allocation signal received by the port originally requesting the pointer decrements a counter on that port; all other ports are unaffected by the signal. Continuing the above example, a logic one signal might be sent on the member of bus 66 that connects buffer pointer return logic 32 to the decrement input of counter 40 on port 0 to decrement the counter; all other counters would receive a logic zero that would not affect the counters. Other encoding schemes may be used.

The buffer pointer FIFO 28 also outputs the number of available buffers in memory (based on the available buffer pointers) on multi-member bus 68, which connects the controller to summing logic 44 on all ports. The data on bus 68 is one input to the summing logic. The other input is the number of buffers in memory currently in use by the particular port, which is provided by the count of up/down counter 40 via a path 70. The summing logic 44 adds these two numbers and produces therefrom a sum at its output. This sum becomes an input via a path 72 to the multiplier logic 46. The other input to the multiplier logic is an allocation factor provided by the register 42 via a path 74. The allocation factor typically (but not necessarily) has a value between 0 and 1, and is supplied to the register by a source such as a CPU. The allocation factor can be changed or adjusted by command and may be independently set for each port. The multiplier logic 46 multiplies the sum and allocation factor and produces therefrom a product at its output. This product becomes an input via a path 76 to the comparator 48. The other input to the comparator is the output of counter 40 (the number of buffers currently in use by the particular port) via path 70. The comparator compares the product from the multiplier to the output of the counter. This comparison is then used to generate a hold signal at the comparator's output that is applied to the port's buffer request logic 50 via a path 78.

The comparison determines whether a buffer request by the port will be generated. In the illustrative embodiment, the comparison determines whether the number of buffers currently in use by the port equals or exceeds the product from the multiplier (the limit number of buffers). If it does, then the hold signal is asserted (e.g., is driven to a predetermined state such as a logic one). If it does not, the hold signal is de-asserted (e.g., is driven to logic zero state). While the hold signal is asserted, the buffer request logic is prevented from generating a buffer request for the port. Other comparisons, of course, may be used, such as exceeding the product only, exceeding the product by a certain number of buffers, exceeding the product for a certain period of time, etc.

Method of Operation

Consider one port of a multi-port switch, noting that each port is regulated in an independent, albeit similar fashion. From this port's perspective, when buffer memory usage by the rest of the switch is light, this port has access to significant amounts of memory to absorb bursts of network traffic. As memory usage by other ports increases, this port's upper limit on memory use is decreased, reducing the potential for interfering with other ports' memory needs. As memory usage by other ports decreases, this port's upper limit on memory use is increased. The regulation of this port's maximum buffer allocation continues in this fashion, constantly adjusting in response to changing loads on the switch.

The method of operation follows from the structure and function of the embodiment and is best understood by example. Assume the following circumstances at time $t_0$, when port 0 must determine whether to request another buffer for an incoming data packet: port 0 currently has in use 90 buffers, the number of available buffers in memory (the unused buffer count) is 500, and the allocation factor for port 0 is 0.5. The number of available buffers is equal to the total number of buffers in memory minus the buffers presently in use by all the ports. The higher the allocation factor is, the greater the number of buffers that can be requested by a port. What needs to be determined is the nature of the hold signal generated at this point by the comparator 48. If the hold signal is asserted, then the buffer request logic 50 is prevented from requesting the additional buffer. In this circumstance, port 0 issues a flow control message to temporarily halt incoming traffic to the port or, in the absence of flow control support, simply discards incoming traffic until buffer memory becomes available.

The switch 18 determines the limit number of buffers that port 0 may use from the number of available buffers in memory and the number of buffers in memory currently in use by the port. In the illustrative embodiment it makes this determination by first adding these two numbers at summing logic 44 to produce a sum at the logic's output. The switch then multiplies the sum by the allocation factor provided by the register 42 at the multiplier logic 46 to produce a product at the logic's output. This product, which is the limit number of buffers in this embodiment, has the following value at time $t_0$:

$$\text{AllocFacThisPort} \times (\text{CurrentUnused} + \text{CurrentThisPort}) = \text{LimitNumber} \quad (1)$$

or $$(500+90) \times 0.5 = 295$$

The limit number is then compared to the number of buffers currently in use at comparator 48. In this embodiment, the comparison takes the following form:

$$\text{CurrentThisPort} >= \text{AllocFacThisPort} \times (\text{CurrentUnused} + \text{CurrentThisPort})? \quad (2)$$

or $$90 >= 295$$

The comparison is negative, in that the number of buffers currently in use by port 0(90) is less than the limit number (295). Consequently, comparator 48 does not assert the hold signal on path 78 and port 0 is allowed to request one of the 500 buffers available at time $t_0$ thereby reducing the number of available buffers to 499.

Assume that by time $t_1$ the other ports in switch 18 have requested and been given 420 of the remaining 499 available buffers and that no other buffers have been made available (i.e., that no port has returned a buffer pointer to the buffer pointer return logic 32). At this time, port 0 must determine whether to request another buffer and the following circumstance exist: port 0 currently has in use 91 buffers, the number of available buffers in memory is 79, and the allocation factor for port 0 is 0.5. Multiplier logic 46 now produces the following product:

$$0.5 \times (79+91) = \text{LimitNumber} = 85$$

The new limit number is now compared to the number of ports currently in use by port 0:

$$91 >= 85?$$

In this circumstance the comparison is positive, in that the number of buffers currently in use by port 0 (91) is greater than the limit number (85). Consequently, comparator 48 asserts the hold signal on path 78 and port 0 is prevented from requesting one of the 79 remaining buffers available at time $t_1$.

Now assume that by time $t_2$ the ports in switch 18 returned 20 buffer pointers to the buffer pointer return logic 32. At this time, port 0 again determines whether to request another. The following circumstance exist: port 0 has 91 buffers in use, the number of available buffers in memory is 99, and the allocation factor for port 0 is still 0.5. Multiplier logic 46 now produces the following product:

$$0.5 \times (99+91) = \text{LimitNumber} = 95$$

The new limit number is now compared to the number of ports currently in use by port 0:

$$91 >= 95?$$

The comparison this time is negative, in that the number of buffers currently in use by port 0 (91) is less than the limit number (95). Consequently, comparator 48 does not assert the hold signal on path 78 and port 0 is allowed to request one of the 99 buffers available at time $t_2$.

The steps of determining the limit number and comparing it to the number of ports currently in use by a particular port are preferably taken each time an incoming packet arrives at a port.

The following, moreover, should be understood. The method of operation may be executed concurrently for each port or in any other fashion with respect to the various ports. The allocation factor may be the same or different for each port, and may be manually set or adjusted automatically in response to data gathered on the incoming traffic at each port.

Having illustrated and described the principles of the invention in an exemplary embodiment, it should be apparent to those skilled in the art that the embodiment can be modified in arrangement and detail without departing from such principles. The invention may be applied to switching devices other than network switches, such as repeaters and routers. The structure may be implemented in either hardware of software. The particular circuit components described may be interchanged with equivalent components known in the art. The buffer pointer manager can be implemented in any number of ways. Similarly, the logic within a port for regulating the buffer memory usage can be implemented in many ways and can be located in or remote from the port. Either the true or inverse signal values can be used in various combinations. In view of the many possible embodiments to which the principles of the invention may be applied, it should be understood that the illustrative embodiment is intended to teach these principles and is not intended to be a limitation on the scope of the invention. I therefore claim as my invention all that comes within the scope and spirit of these claims and their equivalents.

I claim:

1. In a switching device having multiple ports and shared buffer memory, a method of regulating the amount of buffer memory requested by a port, the method comprising:

determining a limit number of buffers that a port may use by combining the number of available buffers in memory and the number of buffers in memory currently in use by the port;

comparing the limit number to the number of buffers currently in use by the port; and using the comparison to determine whether a buffer request by the port will be generated.

2. The method of claim 1 wherein the steps are executed by structure within the port.

3. The method of claim 1 wherein the determining step comprises combining the number of available buffers in memory, the number of buffers in memory currently in use by the port, and a port allocation factor to obtain the limit number of buffers.

4. The method of claim 3 wherein the combining step comprises:

adding the number of available buffers in memory with the number of buffers in memory currently in use by the port to obtain a sum; and applying the port allocation factor to the sum.

5. The method of claim 4 wherein the applying step comprises multiplying the sum by the port allocation factor.

6. The method of claim 1 wherein the using step comprises preventing the buffer request if the comparison shows that the number of buffers currently in use by the port is greater than or equal to the limit number.

7. The method of claim 3 wherein the port allocation factor is independently set for each port.

8. The method of claim 1 wherein the steps are taken each time an incoming packet arrives at a port.

9. The method of claim 1 wherein the steps are taken concurrently by multiple ports.

10. In a switching device having multiple ports and shared buffer memory, a method of regulating the amount of buffer memory requested by a port, the method comprising:

adding the number of available buffers in memory to the number of buffers in memory currently in use by the port to obtain a sum;

multiplying the sum by a port allocation factor to obtain a product;

comparing the product to the number of buffers currently in use by the port; and using the comparison to determine whether a buffer request by the port will be generated.

11. The method of claim 10 wherein the using step comprises preventing the buffer request if the comparison shows that the number of buffers currently in use by the port is greater than or equal to the product.

12. In a switching device having multiple ports and shared buffer memory, an apparatus for regulating the amount of buffer memory for use by a port, the apparatus comprising:

means for determining a limit number of buffers that a port may use by combining the number of available buffers in memory and the number of buffers in memory currently in use by the port;

means for comparing the limit number to the number of buffers currently in use by the port; and means for using the comparison to determine whether a buffer request by the port will be granted.

13. In a switching device having multiple ports and shared buffer memory, an apparatus for regulating the amount of buffer memory requested by a port, the apparatus comprising logic that determines a limit number of buffers that a port may use by combining the number of available buffers in memory and the number of buffers in memory currently in use by the port, compares the limit number to the number of buffers currently in use by the port, and uses the comparison to determine whether a buffer request by the port will be generated.

14. The switching device of claim 13 wherein the logic is located within the port.

15. The switching device of claim 13 wherein the logic comprises:

summing logic receiving the number of available buffers in memory to the number of buffers in memory currently in use by the port;

a multiplier coupled to the output of the summing logic and the output of a register;

a comparator coupled to the output of the multiplier and a source containing the number of buffers currently in use by the port; and buffer request logic coupled to the output of the comparator.

* * * * *